Figure 1:
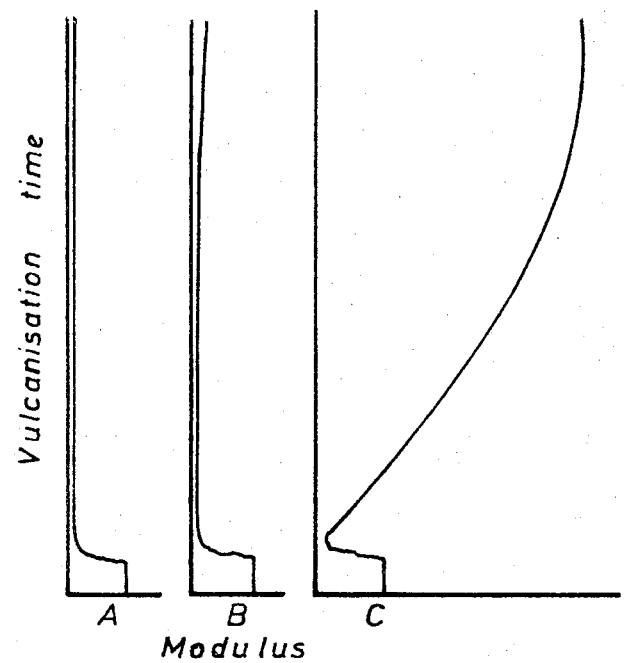

United States Patent [19]

Schentger

[11] 3,846,350
[45] Nov. 5, 1974

[54] PROCESS FOR THE VULCANIZATION AND EXPANSION OF POLYCHLOROPRENE RUBBER WITH AZODICARBNAMIDE

[75] Inventor: Jochen Schentger, Leverkusen, Germany

[73] Assignee: Bayer Aktiengesellschaft, Leverkusen, Germany

[22] Filed: July 2, 1973

[21] Appl. No.: 375,546

Related U.S. Application Data

[63] Continuation of Ser. No. 213,545, Dec. 29, 1971, abandoned, which is a continuation-in-part of Ser. No. 192,936, Oct. 27, 1971, abandoned.

[30] Foreign Application Priority Data
Oct. 29, 1970  Germany............................ 2053081
Dec. 10, 1971  Germany............................ 2161342

[52] U.S. Cl..... 260/2.5 H, 260/2.5 HB, 260/28.5 B, 260/33.6 AQ, 260/41.5 R
[51] Int. Cl............................................ C08d 13/10
[58] Field of Search.......................... 260/2.5 H, 92.3

[56] References Cited
OTHER PUBLICATIONS

Chemical Abstracts; Sulfur–Free Porous Rubbers, Vol. 71, Oct. 6, 1969, pg. 35, Ret. No. 62129Y.

*Primary Examiner*—Morton Foelak
*Attorney, Agent, or Firm*—Connolly and Hutz

[57] ABSTRACT

The invention relates to the use of azodicarbonamide as both a vulcanization and blowing agent for polychloroprene rubber. Furthermore, the mixtures of azodicarbonamide, metal oxide and polychloroprene rubber are found to be very stable in storage.

5 Claims, 4 Drawing Figures

PROCESS FOR THE VULCANIZATION AND EXPANSION OF POLYCHLOROPRENE RUBBER WITH AZODICARBNAMIDE

CROSS REFERENCE TO RELATED APPLICATIONS

This application is a continuation of application Ser. No. 213,545 filed Dec. 29, 1971 and now abandoned which, in turn, is a continuation-in-part of application Ser. No. 192,936 filed Oct. 27, 1971 and now abandoned.

The invention relates to the use of azodicarbonamide as both a vulcanization and blowing agent for polychloroprene rubber. The process hitherto used in the art for producing cellular polychloroprene vulcanizates requires the use of at least two agents in addition to the metal oxides which are used as cross-linking agents, one of these additional agents serving as a blowing agent and the other as a vulcanization accelerator, for example benzene sulphohydrazide as the blowing agent and 2-mercaptoimidazoline as the accelerator. In addition, it is often necessary to add thiourea derivatives as accelerators, e.g., diethylthiourea (Literature: J. C. Hament, DuPont Comp. [United Kingdom] Ltd., Hemel Hempstead — KAUTSCHUK UND GUMMI, KUNSTSTOFFE Year 21, No. 2/1968, pages 69–73).

It is already known to use monoazo compounds (bisazodicarboxylic acid esters) for cross-linking natural rubber and styrene-butadiene rubber but not for cross-linking polychloroprene rubber (Literature: Paul J. Flory, Norman Rabjohn, Marcia C. Shaffer, Goodyear Tire and Rubber Research Laboratory, Akron/Ohio — Journal of Polymer Science, Vol. IV, pages 435–455, 1949 and Vol. IV, pages 225–245, 1949).

Azodicarbonamide has hitherto been used in the art only as a blowing agent for producing cellular rubber (e.g., expanded rubber sections and cellular rubber sheets) (Literature: Findings, Volume No. 18, Chemical blowing agents chemistry and decomposition mechanisms).

It is also known that mixtures which contain both blowing agents and vulcanisation accelerators as well as a cross-linking agent have a very limited storage life owing to the risk of premature vulcanisation. In order to prevent premature vulcanization it has previously been necessary to add the vulcanization accelerator and/or the blowing agent shortly before vulcanization. This additional mixing operation requires additional working time and further costs.

It must therefore be regarded as an advance if a substance can act both as the blowing agent and as the vulcanization accelerator without the risk of premature vulcanization, thereby ensuring an increased length of storage life of the sensitive mixtures based on polychloroprene.

It has now surprisingly been found that when azodicarbonamide is used as a blowing agent in the presence of metal oxides, vulcanization of the polychloroprene rubbers, both those which are modified with sulphur and those of the mercaptan type, can be achieved at the same time. Furthermore, the mixtures of azodicarbonamide, metal oxide and polychloroprene rubber are found to be very stable in storage.

The process according to the invention is characterised in that about 4 to 40 preferably 4 to 30 parts by weight of azodicarbonamide, based on 100 parts by weight of rubber, are added to a conventional polychloroprene mixture which contains metal oxides, particularly magnesium oxide, cadmium oxide, beryllium oxide, lead oxide and zinc oxide. The vulcanization may be carried out by any of the methods commonly used in the art, for example by ultra high frequency vulcanization, fluidized bed vulcanization, salt bath vulcanization, vulcanization in hot air or pressure vulcanization. The vulcanization temperature employed is generally in the range of from 170°C to 300°C (preferably 240°C to 280°C).

Figure 2:
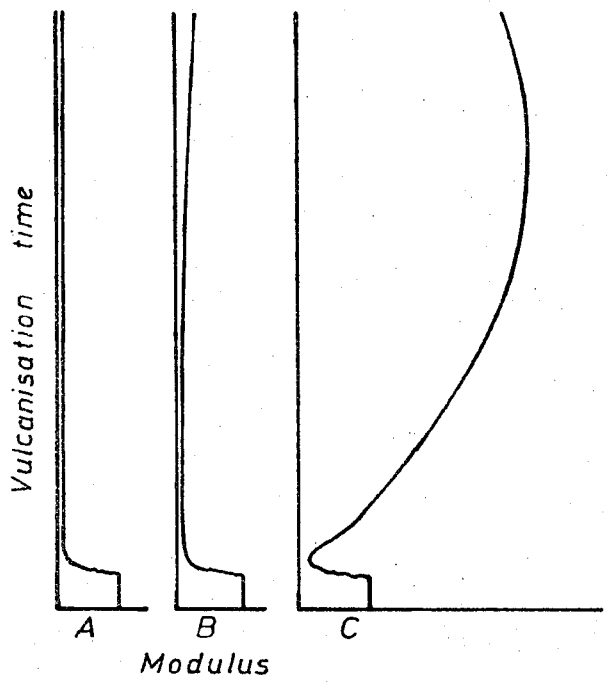

The process according to the invention is particularly suitable for continuous vulcanization processes carried out at an elevated temperature because the resistance to premature vulcanization is substantially improved owing to the fact that the conventional accelerator additives can be dispensed with (FIGS. 1 and 2).

Since the accelerators and blowing agents need not be mixed separately in the process according to the invention, the additional mixing operation can be dispensed with. Moreover, azodicarbonamide is an inexpensive and readily accessible substance, so that the process according to the invention is very economical.

It must be regarded as surprising that azodicarbonamide, which has previously been used only as a blowing agent, also functions as a vulcanization accelerator for polychloroprene rubbers. This is all the more surprising since further tests showed that azodicarbonamide does not function as a vulcanization accelerator for rubbers based on polybutadienepolyisoprene mixtures, natural rubber, polyisoprene and butadiene/acrylonitrile-PVC.

The products produced by the process according to the invention contain the usual additives of zinc oxide, lead oxide, cadmium oxide, beryllium oxide and magnesium oxide. That these constituents cannot result in satisfactory vulcanization when used on their own is shown by mixture A (mixture A, insufficiently vulcanized).

Any of the usual fillers, plasticizers, antioxidants and other additives, e.g., stearic acid, pigments, deodorants or preservatives may be used in the process according to the invention.

The process according to the invention will now be further illustrated by the following Examples: The dimension used if not otherwise cited is parts by weight.

Example 1

| MIXTURE | A | B | C |
|---|---|---|---|
| Lightly crystallising polychloroprene rubber | 100.0 | 100.0 | 100.0 |
| Magnesium oxide | 4.0 | 4.0 | 4.0 |
| Diphenylamine derivative* | 1.5 | 1.5 | 1.5 |
| Antiozone wax | 2.0 | 2.0 | 2.0 |
| Carbon black N 990 (MT-FF)** | 20.0 | 20.0 | 20.0 |
| Chalk | 45.0 | 45.0 | 45.0 |
| Naphthalene mineral oil plasticizer | 20.0 | 20.0 | 20.0 |
| Stearic acid | 1.0 | 1.0 | 1.0 |
| Zinc oxide | 5.0 | 5.0 | 5.0 |
| Azodicarbonamide | — | 5.0 | 5.0 |
| 2-Mercaptoimidazoline | — | — | 1.0 |
| Diphenylthiourea | — | — | 1.0 |
| * Antioxidant | | | |
| ** Sterling MT-FF was used | | | |
| Mooney-scorch : 120°C (MS-5) | | | |
| after 7 days' storage at 30±2°C | >45' | >45' | 4' |
| after 14 days' storage at 30±2°C | >45' | >45' | 3' |

Using the above test formulation, rubber mixtures were prepared on mills in the usual manner.

Vulcameter curves were drawn up.

FIG. 1 shows the vulcameter curves of the three mixtures A, B, and C after 7 days' storage at a temperature of 30±2°C, determined with a Frank-Vulcameter Type 9011, Bayer Model, (DIN 53529) temperature 150°C, measuring range 6 short, rate of feed 660 mm/h.

FIG. 2 shows the vulcameter curves after 14 days' storage at a temperature of 30±2°C, using the same measuring instrument as for FIG. 1 and under the same conditions.

Figure 3:
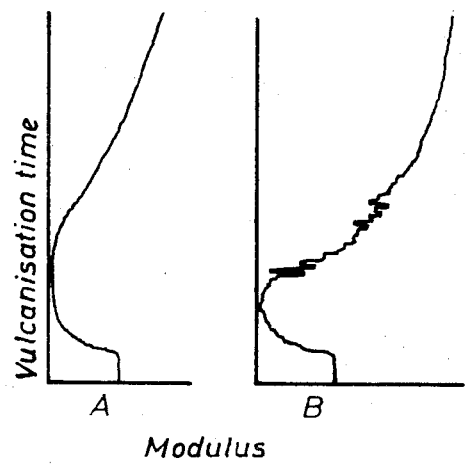

FIG. 3 shows the vulcameter curves of mixtures A and B after 14 days' storage at a temperature of 30±2°C, determined with a measuring instrument as described for FIG. 1, temperature 240°C, measuring range 6 short, rate of feed 1,200 mm/h. Mixture C was not measurable.

The Mooney scorch value was determined according to DIN 53 524.

Vulcanization was carried out in a salt bath at 240°C after the storage times indicated in each case.

Example 2

The carrying out of the process according to the invention is explained by the following example:

| | |
|---|---|
| Polychloroprene (mercaptan type) | 100,0 |
| Mineral oil plasticizer | 33,0 |
| Phenyl-beta-naphthylamine | 2,0 |
| Stearic acid | 7,0 |
| Magnesium oxide | 4,0 |
| Zinc oxide | 5,0 |
| Chalk | 100,0 |
| Dye | 2,0 |
| Azodicarbonamide | 20,0 |

| Mooney scorch time | at 120°C (MS-5) | over 45 minutes |
|---|---|---|
| | at 130°C (MS-5) | 32 minutes |

Using the given test formulation rubber compounds were prepared in the usual way on mills. The Mooney scorch value was determined according to DIN 53 524.

The stability in storage of the given mixture was evaluated after the increase in Mooney viscosity in dependence on the storage time and temperature.

The increase in Mooney viscosity by 20 units after storage at the following temperatures served as the criterion:

| | | |
|---|---|---|
| 120°C | 2.3 hours | |
| 100°C | 7.5 hours | |
| 80°C | 70 hours | |
| 60°C | 230 hours | ( 9.5 days) |
| 50°C | 370 hours | (15.5 days) |

Figure 4:
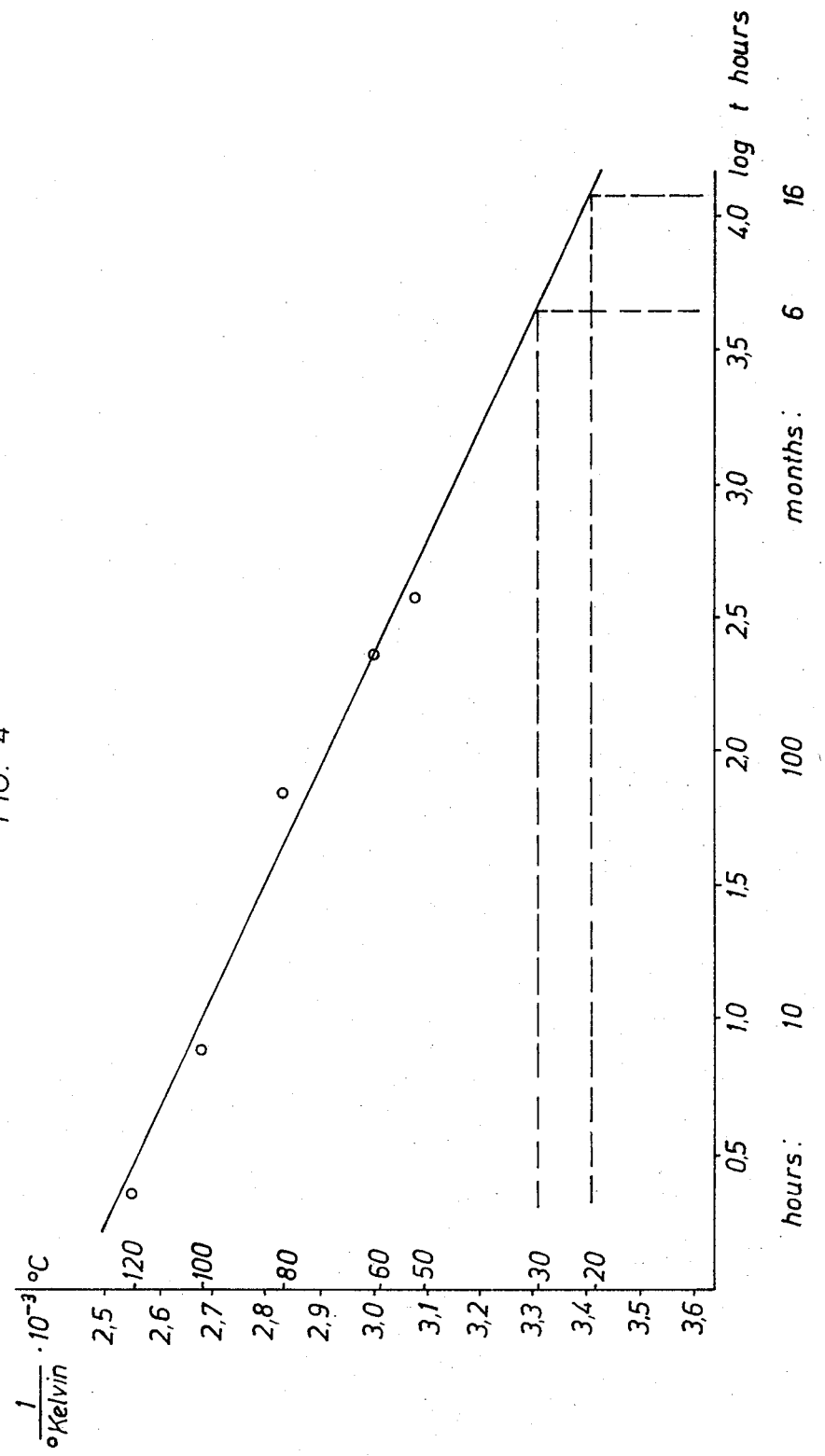

If these critical times are entered into the FIG. 4 coordinate system absciss = log time (hours)

ordinate = inverse value of the absolute temperature (1/°Kelvin) then they lie in a straight line which justifies extrapolation to room temperature.

This yields at 20°C a critical storage period of approximately 16 months.

What we claim is:

1. A process for the production of a cellular polychloroprene vulcanizate comprising heating a mixture of polychloroprene, at least one metal oxide and azodicarbonamide whereby said mixture is vulcanized and expanded.

2. A process as claimed in claim 1, wherein the azodicarbonamide is present in an amount of from 4 to 40 parts by weight based on 100 parts by weight of polychloroprene.

3. A process as claimed in claim 1 wherein the polychloroprene mixture is vulcanized at a temperature of from 170°C to 300°C.

4. A process as claimed in claim 3, wherein the polychloroprene mixture is vulcanized at a temperature of from 240°C to 280°C.

5. A mixture comprising a polychloroprene rubber and an azodicarbonamide in an amount of from 4 to 40 parts by weight based on 100 parts by weight of the polychloroprene rubber, and at least one metal oxide.

* * * * *